United States Patent
Aaron, III (12) 
(10) Patent No.: US 6,543,120 B2
(45) Date of Patent: Apr. 8, 2003

(54) METHOD FOR RETAINING A SEAL RING

(75) Inventor: John W. Aaron, III, Houston, TX (US)

(73) Assignee: Specialty Piping Components, Inc., Houston, TX (US)

( * ) Notice: Subject to any disclaimer, the term of this patent is extended or adjusted under 35 U.S.C. 154(b) by 0 days.

(21) Appl. No.: 10/071,543

(22) Filed: Feb. 8, 2002

(65) Prior Publication Data

US 2002/0070543 A1 Jun. 13, 2002

Related U.S. Application Data

(62) Division of application No. 09/578,939, filed on May 25, 2000, now Pat. No. 6,454,316.

(51) Int. Cl.$^7$ ............................. B23P 11/02; F16L 17/00
(52) U.S. Cl. ............................. 29/451; 29/450; 285/379
(58) Field of Search ........................ 29/450, 451, 426.1, 29/426.6, 525.01; 285/335, 337, 363, 354, 364, 379, 380

(56) References Cited

U.S. PATENT DOCUMENTS

| | | | |
|---|---|---|---|
| 3,909,011 A | 9/1975 | Sheesley | 277/11 |
| 4,199,151 A | 4/1980 | Bartos | 277/306 |
| 4,272,109 A | 6/1981 | Ahlstone | 285/336 |
| 4,431,054 A * | 2/1984 | Woodman | 166/125 |
| 5,409,337 A | 4/1995 | Muyskens et al. | 411/148 |

FOREIGN PATENT DOCUMENTS

WO    WO 00/17548    3/2000

* cited by examiner

Primary Examiner—I Cuda-Rosenbaum
Assistant Examiner—John C. Hong
(74) Attorney, Agent, or Firm—Gray Cary Ware & Freidenrich, LLP (57) ABSTRACT

A seal retaining system for retaining a seal ring in a pipe coupling, wherein a plurality of seal ring retainers are connected to a flange around the periphery of a seal seat and wherein the retainers can be moved from an open position in which a seal ring can be placed on or removed from the seal seat to a closed position in which the seal ring is retained in position on the seal seat. In one embodiment, each retainer comprises a rotatable cam having a lip which extends generally around the circumference of the cam, but is truncated on one side. When the truncated portion faces the seal seat, the seal ring can be installed or removed. When the truncated portion faces away from the seal seat, the seal ring is held in position on the seal seat. The cams may be attached with bolts that can be sheared off if the cams are frozen in position.

12 Claims, 5 Drawing Sheets

UN-SEATED POSITION

FIG. 3b

SEATED POSITION

METHOD FOR RETAINING A SEAL RING

RELATED APPLICATIONS

This application is a division of and claims the benefit of the filing date of U.S. patent application Ser. No. 09/578,939 by inventor John William Aaron III entitled "Seal Ring Retainer" filed on May 25, 2000 now U.S. Pat. No. 6,454, 316 and hereby incorporates this application by reference in its entirety as if it had been fully set forth herein.

BACKGROUND OF THE INVENTION

1. Field of the Invention

The invention relates generally to pipe couplings and more particularly to a system and method for retaining seal rings against a pipe flange to facilitate making and breaking of a pipe coupling.

2. Description of Related Art

The use of pipelines for handling fluids is widely known. High-volume pipelines are commonly used to carry oil, gas and other fluid hydrocarbons. High-pressure or high-temperature pipelines are commonly used in industrial applications. Pipelines may also be designed for many other purposes, such as carrying corrosive, toxic or otherwise dangerous fluids.

The pipelines used in these applications typically consist of a number of pipe sections which are connected end-to-end to form a single conduit. Typically, the pipe sections are joined by means of couplings or connectors which consist of a set of flanges attached to the ends of the pipe sections. The flanges are bolted or held together in some other manner to form a continuous conduit.

Is important to ensure that the couplings between pipe sections form tight seals. This is particularly true in systems which are designed to handle dangerous fluids (e.g., those which are operated at high pressures or high temperatures, or those which carry dangerous fluids.) Pipe couplings therefore normally include a gasket or some other type of seal located between the flanges of the couplings to provide a good seal.

Figure 1A:
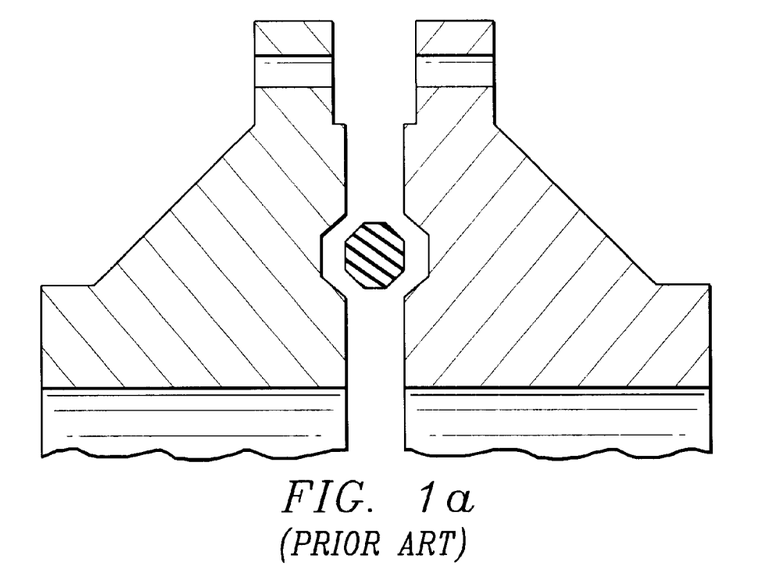
FIG. 1a is a cross-sectional view of a standard API coupling in a disassembled configuration.
Figure 1B:
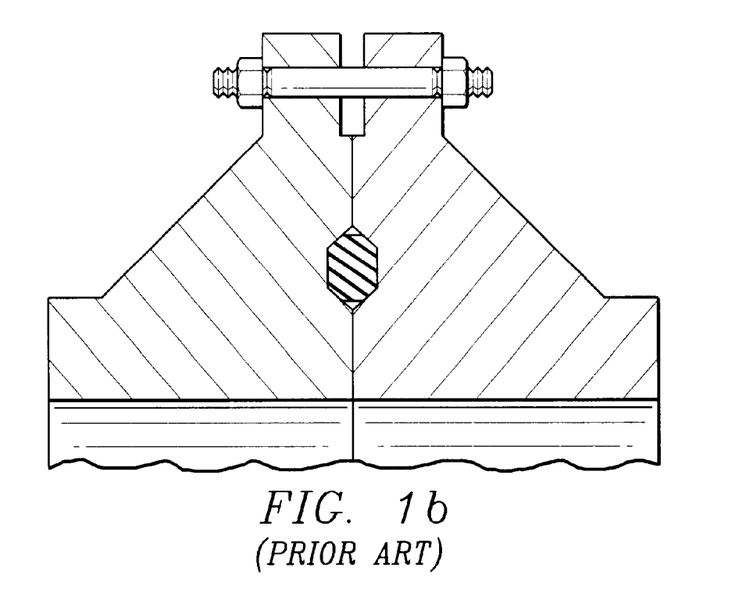
FIG. 1b is a cross-sectional view of a standard API coupling in an assembled configuration.

In many heavy-duty, industrial systems such as oil transport pipelines, the pipelines may be very large and may have very thick walls which are designed to withstand tremendous pressures. For example, the pipe sections may be tens of inches in diameter and may have walls several inches thick. An example of a standard API coupling is illustrated in FIGS. 1a and 1b. FIG. 1a shows the disassembled flanges and seal ring, while FIG. 1b shows the assembled coupling. The seal rings used in the couplings must likewise be designed to withstand the high pressures and are often constructed of metal rather than a more elastic, but weaker and less durable material.

Because of their size, oil pipelines are heavy and unwieldy and are therefore difficult to construct and maintain. Although the flanges which are used in pipe couplings, such as standard ANSI and API flanges, are very simple in design, the size and weight of the components can make them difficult and dangerous with which to work. The danger and difficulty of working with these pipelines is often compounded by having to work in harsh environments. For example, many oil pipelines are installed in sub-sea environments, where vision may be severely limited, where movement may be difficult and where, if equipment is mishandled and dropped, it may fall to the sea floor and be unrecoverable.

One particular problem concerns the seal rings used in the couplings. As shown in FIGS. 1a and 1b, the seal ring simply sits in a groove (the seal seat) without being held in position. Consequently, the seal ring may easily be moved out of its seated position. If the coupling is assembled with the seal ring out of position, it may be damaged and may not provide a good seal. If the flange faces are vertically oriented, the seal ring may simply fall out of place. It is not unusual for the seal ring of a standard ANSI coupling to be improperly seated, damaged, or even lost when a worker is attempting to bolt up the coupling or to unbolt and break the coupling.

SUMMARY OF THE INVENTION

The present invention is intended to simplify the assembling or disassembling ("making" or "breaking") of a coupling by providing a retaining system for retaining a seal ring on one side of the coupling. Once the seal ring is placed in the proper position against one of the flanges of the coupling, the retaining system is used to hold it in that position. The seal ring secured by the retaining system cannot be moved out of position and therefore will not be damaged when the coupling is assembled. Further, the seal ring cannot fall out of place and cannot be lost when the coupling is disassembled. The present system and method thereby reduce the cost and effort related to assembly, disassembly and maintenance of pipe couplings.

One embodiment of the invention comprises a seal retaining system for retaining a seal ring in a pipe coupling, wherein a plurality of seal ring retainers are connected to a flange around the periphery of a seal seat and wherein the retainers can be moved from an open position in which a seal ring can be placed on or removed from the seal seat to a closed position in which the seal ring is retained in position on the seal seat. In this embodiment, each retainer comprises a rotatable cam having a lip which extends generally around the circumference of the cam, but is truncated on one side. When the truncated portion faces the seal seat, the seal ring can be installed or removed. When the truncated portion faces away from the seal seat, the seal ring is held in position on the seal seat. The cams may be attached with bolts that can be sheared off if the cams are frozen in position.

In one embodiment, a retaining system is implemented in a coupling having tapered, mating flanges and a tapered seal ring. In this type of coupling, a tight seal is provided by tapered male and female surfaces which are drawn together to compress the tapered seal ring therebetween. Because the seal is effected by the tapered surfaces, a gap can be allowed to remain between the planar surfaces of the flanges (standard flanges generally have no such gap.) A series of rotatable cams are placed generally around the circumference of the tapered surface on one of the flanges, where they can be positioned to extend over the edge of the seal ring and retain it in position against the flange. When the cams are rotated away from the seal ring, it can be removed from its position against the flange.

One embodiment comprises a method for assembling and/or disassembling a coupling which incorporates a seal ring retaining system as described herein. A first flange incorporating a plurality of cams is provided. The cams are located around a seating face of the flange and each cam is attached to the flange by a screw which is screwed into a corresponding threaded hole in the face of the flange. Each cam is loosened, if necessary, and rotated to an open position in which the cam does not extend over the position of a seal ring on the seating face. The seal ring is placed on the seating face, and the cams are rotated to their closed positions, in which part of each cam extends over part of the seal ring. The cams thereby prevent the seal ring from being removed from its position against the seating face of the first flange. The first flange is then placed in position against a second flange, with the seal ring contacting and forming a seal between the two flanges. The flanges are then secured together to form a sealed coupling.

When it is desired to disassemble the coupling, the bolts or other means which secured the flanges together are loosened and/or removed. The flanges are then separated, with the seal ring being retained on the first flange. The seal ring can be removed from the first flange by loosening each of the screws which attach the cams to the flange and rotating the cams to their open positions. If the screws cannot be loosened, the screws can be sheared off with a chisel or other tool. The screws can be shared off without damaging the seal ring or the seating face. When the cams are in their open positions or have been removed by shearing off the attachment screws, the seal ring can be a removed from its position on the seating face of the flange. If desired, a new seal ring can be seated on the flange and secured by the retaining system. Even if one or more of the cams have been removed (e.g., by shearing off their attachment screws,) it may be possible to secure the new seal ring with the remaining cams.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

One embodiment of the invention is described in detail below. This embodiment is intended to be illustrative rather than limiting. In this embodiment, a plurality of cams are rotatably connected to one flange in a tapered-seal coupling. Each of the cams can be rotated from an "open" position to a "closed" position. When the cams are in the "open" position, a tapered seal ring can freely be placed on, or removed from, a seated position on the tapered surface of the flange. When the cams are in the "closed" position, a portion of each cam extends inward, over the seal ring to hold the seal ring in a seated position on the tapered surface of the flange.

Figure 2:
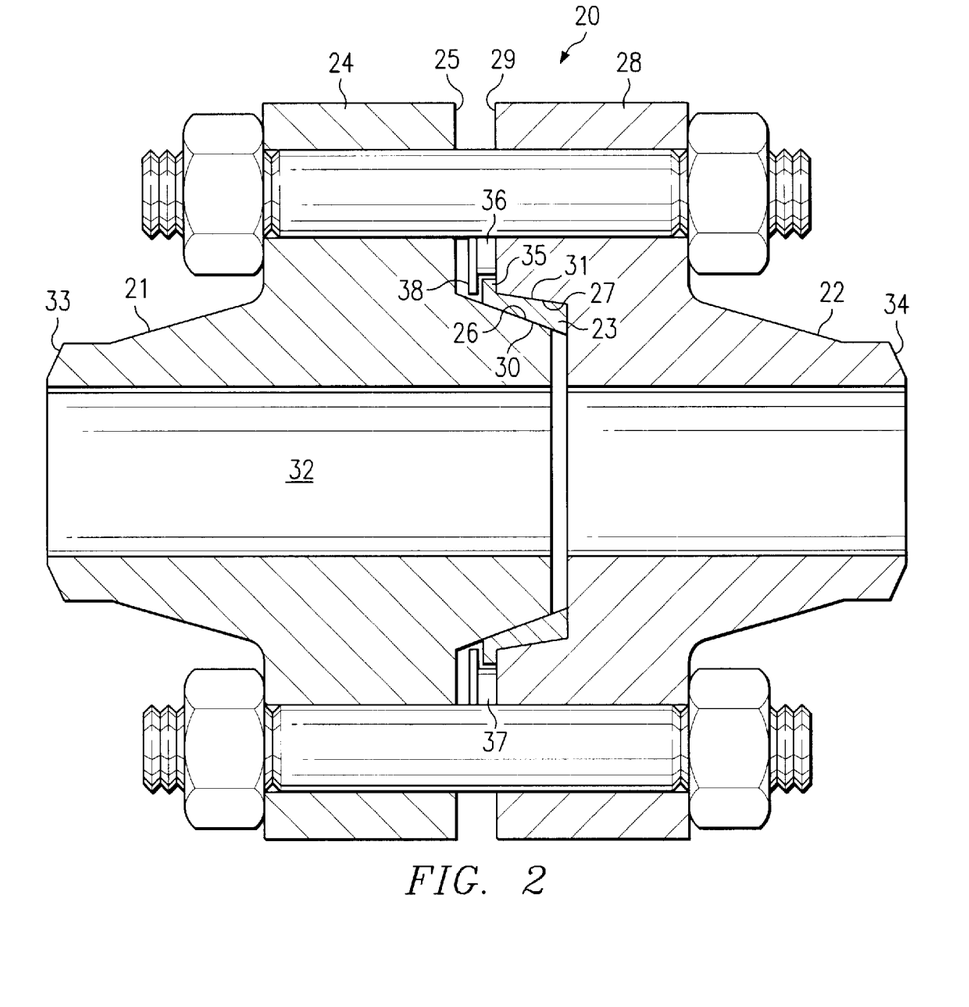
FIG. 2 is a cross-sectional view of a tapered-seal flange incorporating one embodiment of the seal retaining system.

Referring to FIG. 2, a tapered-seal pipe coupling is illustrated. In this embodiment, coupling 20 consists primarily of a male flange 21, a female flange 22 and a seal ring 23. The rearward ends of the flanges (i.e., the ends which face away from the other flange) each have beveled edges 33, 34 which are configured to allow the flanges to be welded to pipe sections.

Male flange 21 has an outer portion 24 which has holes therethrough for bolting the flange to female flange 22. At its forward end (i.e., the end which faces the female flange,) male flange 21 has an outer, planar surface 25 and an inner, tapered surface 26. Tapered surface 26 can also be described as a frusto-conical or truncated conic section. Tapered surface 26 is configured to fit generally within a cavity formed by a corresponding tapered surface 27 of female flange 22.

Female flange 22 has an outer portion 28 corresponding to outer portion 24 of male flange 21. Outer portion 28 has a corresponding set of holes through which bolts are installed to secure the female flange to the male flange. Female flange 22 has, at its forward end, an outer, planar surface 29 and an inner, tapered surface 27 (the forward end of female flange 22 is the end which faces male flange 21.)

In the assembled coupling, male flange 21 and female flange 22 are separated by seal ring 23. Seal ring 23 has an inner surface 30 which is tapered at the same angle as the inner, tapered surface 26 of male flange 21. Seal ring 23 has an outer surface 31 which is tapered at the same angle as the inner, tapered surface 27 of female flange 22. The angles of the inner and outer surfaces 30, 31 of seal ring 23 are tapered at different angles so that the seal ring is thicker entity at the end which has a smaller diameter (i.e., the end which is exposed to the interior pressure of the coupling.) Because seal ring 23 and the tapered surfaces of the male and female flanges 21, 22 are tapered in this manner, high pressures at the interior 32 of the coupling wedge the seal ring more tightly into the gap between the tapered surfaces of the flanges. Seal ring 23 incorporates a lip 35 which extends radially outward from outer surface 31 and helps to maintain the seal ring in an even, seated position.

A plurality of cams 36, 37 are connected to the outer, planar surface 29 of female flange 22. Each of the cams has a lip 38 which, in a closed position, extends inward over the lip 35 of seal ring 23. Because the cams thereby prevent forward movement of seal ring 23 with respect to female flange 22, the seal ring is retained in place against the inner, tapered surface 27 of the female flange.

Figure 3A:
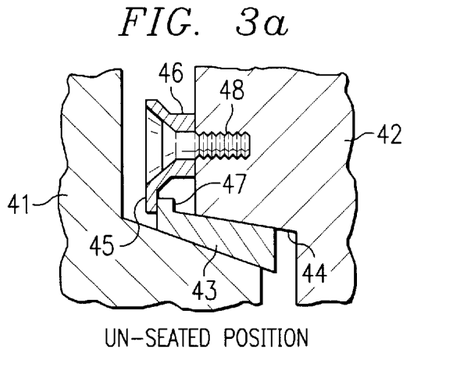
FIG. 3a is a partial cross-sectional view of one embodiment of the seal retaining system, wherein the seal ring is in an unseated position.
Figure 3B:
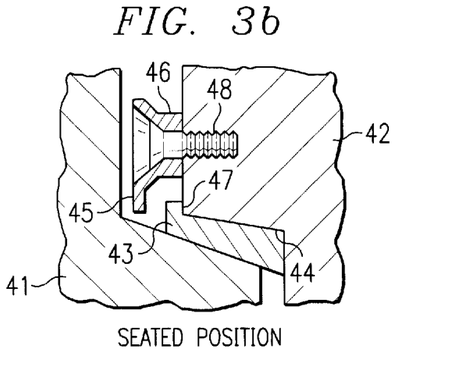
FIG. 3b is a partial cross-sectional view of one embodiment of the seal retaining system, wherein the seal ring is in a seated position.

Referring to FIGS. 3a and 3b, the structure of the cams is shown more clearly. FIG. 3a illustrates a portion of the coupling when the flanges 41, 42 are not tightly bolted together and the seal ring 43 is not fully seated against the tapered surface 44 of the female flange. When seal ring 43 is not in a fully seated position, the lip 45 of cam 46 contacts the lip 47 of seal ring 43 and prevents the seal ring from moving forward, away from the female flange (toward the left in the figure.) FIG. 3b illustrates the same portion of the coupling when flanges 41 and 42 are tightly bolted together and seal ring 43 is fully seated against the tapered surface 44 of the female flange. As the bolts of the coupling are tightened, the flanges are drawn together. This causes the seal ring to be compressed to some degree and forced into a seated position against the female flange. As a result of the seal ring moving to a fully seated position, it is no longer in contact with the lip of the cam.

It should be noted that one of the characteristics of a tapered-surface coupling of this type is a stand-off, or gap, between the outer, planar surfaces of the male and female flanges. Because this gap is normal in the design of this type of coupling, the cams can be positioned in the gap, and no substantial change to the design of the coupling is required. In fact, couplings which have already been manufactured can easily be modified to incorporate the cams, simply by drilling and tapping holes for the screws 48 which hold the cams in position. Other types of couplings may require much more substantial modifications in order to incorporate the cams of the present retaining system.

Figures 4, 5:
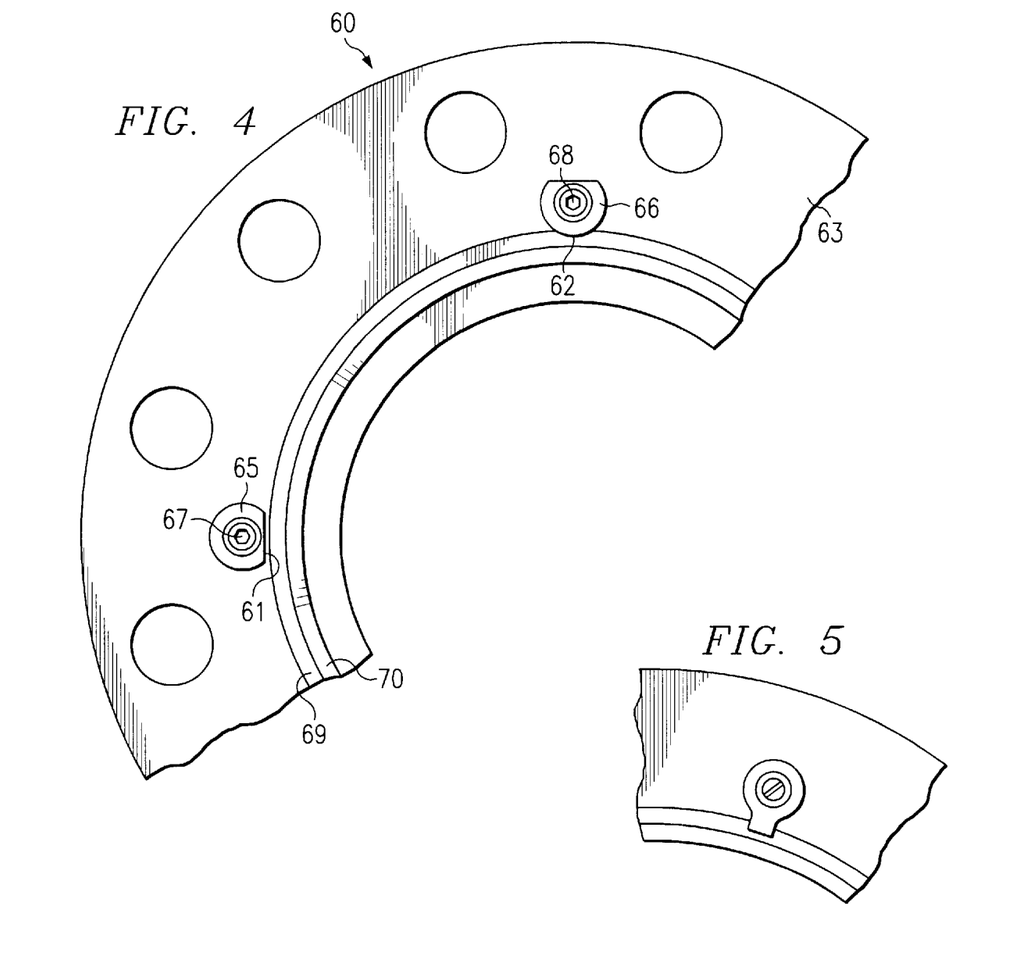
FIG. 4 is a partial view of a flange illustrating the positioning of the cams in relation to the flange and seal ring in one embodiment of the seal retaining system.
FIG. 5 is a partial view of a flange illustrating the shape of a cam in an alternate embodiment of the seal retaining system.

Referring to FIG. 4, a partial view of the face of the female flange is shown. Cams 61 and 62 are attached to the outer, planar surface 63 of female flange 60. It can be seen from the figure that the lip 65, 66 of each cam is essentially a truncated annulus. When the set screw 67, 68 of the cam is loosened, the cam can be rotated to either an open position, where the lip of the cam does not extend over the lip 69 of the seal ring, or a closed position, where the lip of the cam extends over the lip of the seal ring. Cam 61 is shown in an open position, while cam 62 is shown in a closed position.

It should be noted that, while the cams described above have a lip which is a truncated annulus, the cams may have other shapes in other embodiments. For example, a cam may have a lip which is a single protrusion from the body of the cam. Such an embodiment is illustrated in FIG. 5, which shows a portion of a flange face including the cam. Although many such variations are possible, it is contemplated that embodiments in which the lip extends around a larger portion of the cam are preferred because there is less risk that these embodiments will be inadvertently or accidentally moved to an open position.

As shown in FIG. 4, when in the closed position, the cams in this embodiment extend over the lip 69 of the seal ring, but not over the tapered, inner surface 70. The seal ring can therefore be held in place against the female flange without interfering with the seal between the inner surface 70 of the seal ring and the tapered sealing surface of the male flange. This can also be seen in FIGS. 2, 3a and 3b.

It can also be seen in FIG. 4 that the cams are positioned midway between adjacent bolt holes. This allows the clearance between the cams and the bolt holes to be maximized. When positioned in this manner, it may be possible to incorporate the cams in relatively small-diameter flanges.

In one embodiment, the screws which are used to secure the cams to the female flange are made from a material which has less strength than the hardened steel of the flange. It is practical to use such materials because it takes very little force to hold the seal ring in place against the flange. The advantage of using a weaker material is that, if the screws freeze up or cannot be removed for some reason, they can simply be sheared off. It is contemplated that these shearable screws may be made of brass or nylon, although many other materials may be suitable.

Figures 6, 7, 8:
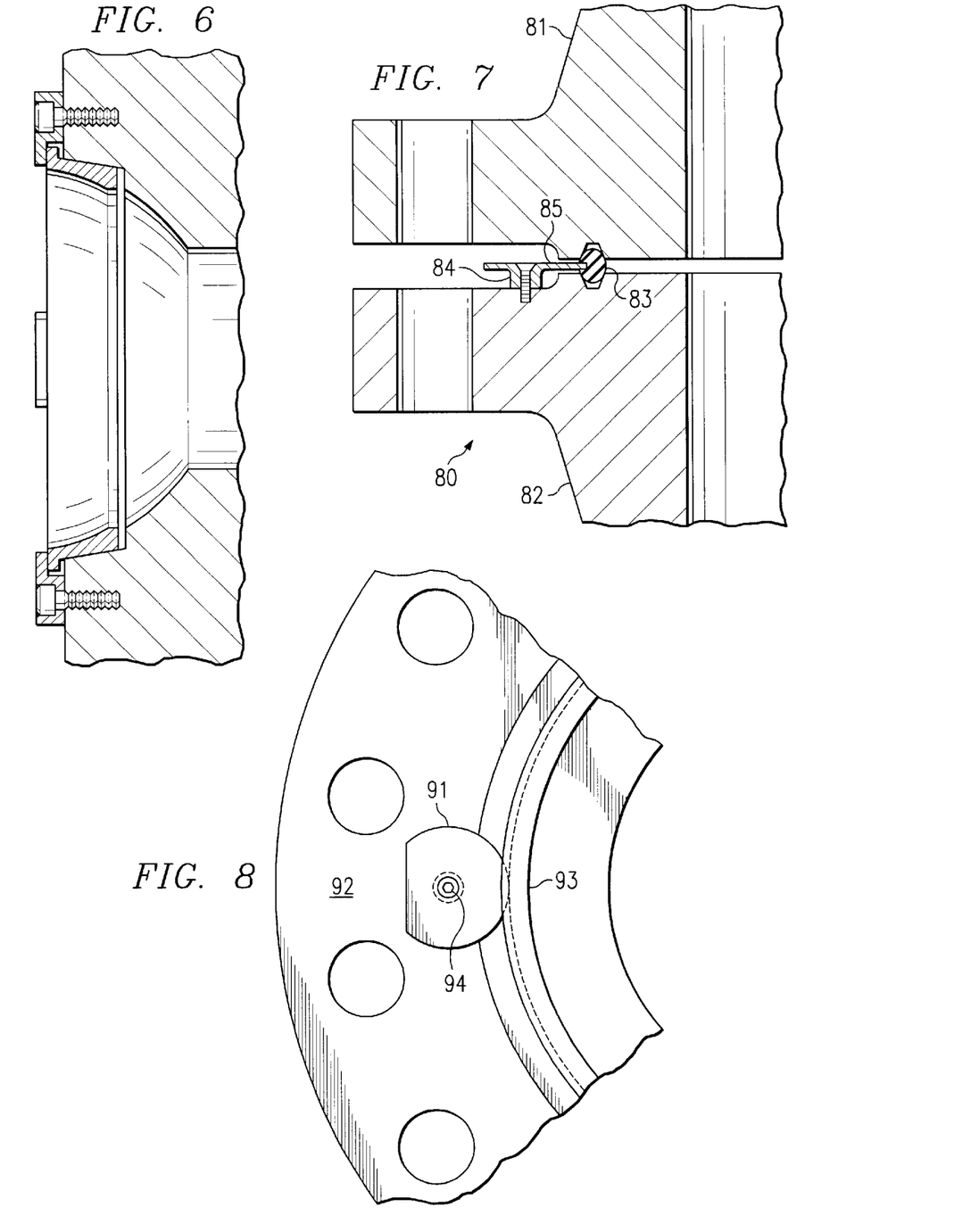
FIG. 6 is a cross-sectional view of a flange, seal ring and seal ring retaining system in an alternate embodiment of the seal retaining system.
FIG. 7 is a cross-sectional view of an ANSI RTJ type coupling incorporating one embodiment of the seal retaining system.
FIG. 8 is a partial view of the face of an ANSI RTJ type flange incorporating one embodiment of the seal retaining system.

It should be noted that the seal ring retaining system described above can be used with many different types of couplings, and the cams used in each embodiment may vary to suit the particular embodiment in which they are used. For example, FIG. 6 shows the female flange of a misalignment coupling. The seal ring shown in this embodiment has a tapered outer surface and a spherical inner surface which is configured to provide a seal against a spherical surface of the male misalignment flange. The seal ring retaining system functions in the same manner as described above, with the cams extending over the lip of the seal ring to hold it in place against the female flange. It should also be noted that the cams shown in FIG. 6 and the screws which secure them to the female flange have a slightly different design than those shown in FIGS. 3a and 3b.

While the embodiments described above are implemented in couplings which use tapered and spherical sealing surfaces, the seal retaining system can also be implemented in more traditional types of flanges. For example, FIG. 7 shows an embodiment which is implemented in a typical ANSI RTJ coupling. Rather than having a male flange and a female flange, coupling 80 uses two symmetrical flanges 81, 82. Each of the flanges has a groove which forms a seat for seal ring 83. Cams 84 are attached to flange 82 around the periphery of seal ring 83. When cam 84 is in a closed position as shown, lip 85 of the cam extends inward toward seal ring 83. Lip 85 fits within a groove which is cut into seal ring 83. Seal ring 83 is thereby held in position against flange 82.

Because an ANSI RTJ coupling is designed to have the two planar faces of the flanges almost come into contact when the coupling is assembled, there is not enough space between them to locate a cam similar to that used in the embodiments described above. That is, the body of the cam cannot be located immediately adjacent to the seal ring. Consequently, cam 84 which is used in this embodiment is installed further out, closer to the portion of the flanges through which the bolt holes extend. Because cam 84 is positioned further away from seal ring 83 in this embodiment, lip 85 of the cam must be longer (from the cam's attachment screw to the seal ring) in order to hold the seal ring in place. Lip 85 must also be sufficiently thin that it does not interfere with the axial movement of the flanges and the compression of seal ring 83. The thin cross section of lip 85 also allows it to flex somewhat. Because lip 85 can flex, it does not substantially interfere with radial expansion of seal ring 83. It should be noted that this embodiment does not require modification of the flange beyond providing threaded holes for the attachment screws of the cams.

FIG. 8 generally corresponds to FIG. 7 and shows the face of the flange with the seal ring installed and the cam in a closed position. FIG. 8 shows additional detail of cam 91 in relation to flange 92 and seal ring 93. It can be seen in this figure that the attachment screw 94 which secures cam 91 to flange 92 (and the hole in the cam through which the screw extends) is slightly eccentric (off-center.) This allows the depth of the lip of cam 91 in the groove of seal ring 93 to be adjusted. Because the hole is displaced toward the truncated side of the lip, the outer edge of the lip moves radially inward (i.e., deeper into the groove) as the cam is rotated away from the open position. The lip reaches its maximum depth in the groove when the truncated portion of the lip faces directly away from the seal ring. It should be noted that the adjustability resulting from the eccentric positioning of the attachment hole reduces the need for tight location tolerances when drilling the holes.

Figure 9:
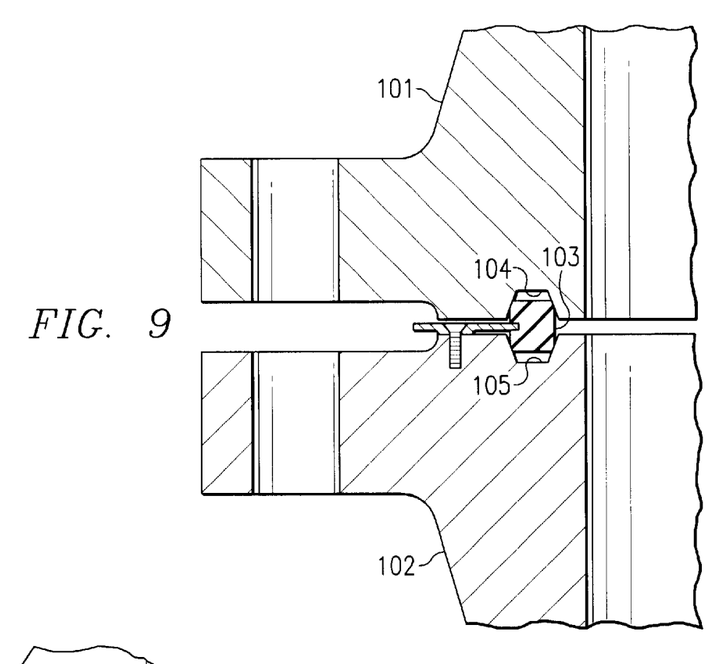
FIG. 9 is a cross-sectional view of an API 'BX type' coupling incorporating one embodiment of the seal retaining system.

Referring to FIG. 9, an alternate embodiment of a coupling using the present seal ring retaining system is shown. In this instance, flanges 101 and 102 are API 'BX type' flanges. These flanges are used with a seal ring 103 which has a square cross-section. In an unmodified 'BX type' coupling, the faces of flanges 101 and 102 are too close when the coupling is assembled and tightened to allow a cam to extend therebetween for holding the seal ring in place. Therefore, a portion of the flange face is milled to format a recess in which the cam can be positioned. Recess 115 can be seen more clearly in FIG. 10, which is a partial view of the face of the flange. It can be seen that recess 115 is milled from the outer edge of the flange face to the groove in which the seal ring is seated in order to facilitate shearing of the attachment screw if that becomes necessary.

Figure 10:
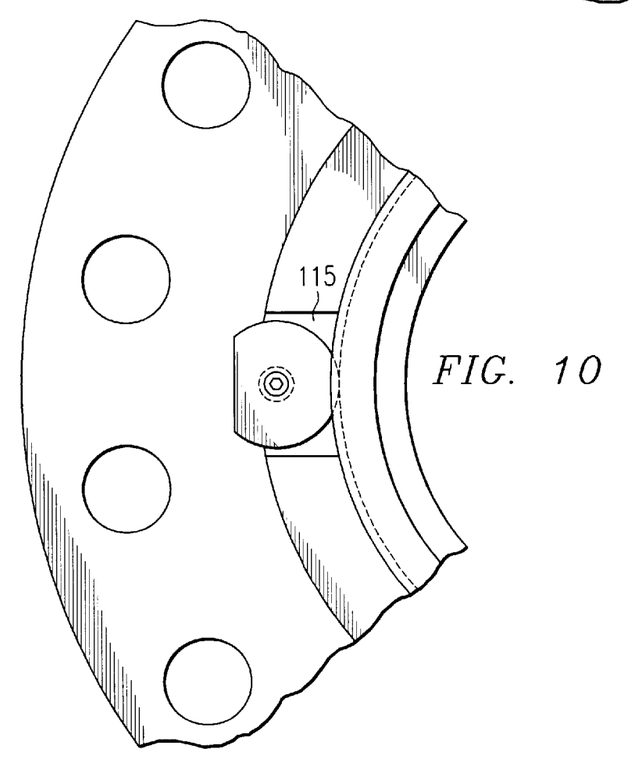
FIG. 10 is a partial view of the face of an API 'BX type' flange incorporating one embodiment of the seal retaining system.

As can be seen from FIGS. 9 and 10, the configuration of an API 'BX type' coupling using the present seal ring retaining system is similar to that of an ANSI RTJ which employs this system. In the 'BX type' coupling, it is important for the entire cam to be as thin as possible, instead of only the lip of the cam. This minimizes the amount of milling necessary to provide a recess sufficient to accommodate the cam. Otherwise, the design of the cam takes into account the same considerations as for the cam used in the ANSI RTJ coupling.

It should also be noted that, because the recessed configuration of the cam causes it to be offset from the center of the coupling, the groove in seal ring 103 must itself be offset. (The "center" of the coupling, as used here, refers to the plane located midway between the faces of the flanges.) Alternatively, the groove must be wide enough to accommodate the offset of the cam. Further, it should be noted that the milling of the flange face may affect the integrity of the seal. As shown in FIG. 9, seal ring 103 fits within grooves 104 and 105. As the coupling is tightened, seal ring 103 is compressed against the walls of grooves 104 and 105. If the recess is milled into the portion of groove 105 which compresses the seal ring, the compression of seal ring 103 will be reduced and the seal between the flanges may be degraded. It may therefore be necessary in this embodiment to use couplings which have higher pressure ratings (before milling) than would otherwise be necessary.

It should be noted that, although the two embodiments described immediately above utilize a seal ring having a groove therein, this groove may not be necessary. The purpose of the groove is to provide a surface (i.e., the wall of the groove) which the cams can contact and thereby hold the seal ring in position. The seal ring may just as easily incorporate a lip which extends outward, toward the cams, similar to the lip of the tapered seal ring. Thus, the configuration of the seal ring may vary from one embodiment to another.

As indicated above, the foregoing embodiments of the seal ring retaining system are exemplary, and many other embodiments of the system are possible. Embodiments comprising methods for retaining seal rings positioned on flange faces are also contemplated. One embodiment comprises a method of using the seal ring retaining systems described above. A first flange is provided, wherein the flange has a seat for a seal ring and a plurality of rotatable cams around the outer edge of the seal seat. Each of the cams is first moved to an open position. This can be done by loosening the set screw which attaches the cam to the flange and rotating the cam so that it does not extend over the seal seat. A seal ring is then positioned against the seal seat. Each of the cams is then moved to a closed position and its set screw is tightened to hold it in this position. The seal ring is thereby held in position against the flange. The first flange can then be assembled with a second flange and secured to form the completed coupling.

Although each of the cams should be secured in the closed position, the seal ring retaining system may function with as few as two of the cams being properly positioned (i.e., closed.) If only two cams are in the closed position, they should be located as nearly opposite each other as possible on the face of the flange to optimize retention of the seal ring. Employing more than two cams to retain the seal ring minimizes the chance that the system will fail to retain the seal ring in the event that one or more of the cams is not properly positioned, is damaged, or somehow fails.

In a coupling which employs this seal ring retaining system, disassembly of the coupling is as easy as simply breaking the connection (i.e., unbolting and separating the flanges.) The seal ring will be retained on one of the flanges when they are separated rather than falling from between the flanges and potentially being lost. The coupling may therefore be easily reassembled, if desired. If it is not necessary to reassemble the coupling, or if the seal ring needs to be changed, the seal ring can be removed by loosening the set screw for each of the cams, rotating the cams to their open positions and removing the seal ring from the flange. If the set screws cannot be loosened to allow the cams to be rotated, the cams can be removed by shearing off the set screws. While a cam cannot be reused after its set screw has been sheared off, this does not in any way affect the ability of a seal ring to be seated on the flange so that the coupling can be reassembled and reused.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A method for retaining a seal ring against a pipe flange comprising:
   providing a first flange having a seal ring seating face and one or more seal ring retainers arranged around the circumference of said seating face;
   positioning each of said seal ring retainers in a first position in which a seal ring can be placed against said seating face;
   placing a seal ring against said seating face; and
   positioning each of said seal ring retainers in a second position in which said seal ring is retained against said seating face by pivoting each of said seal ring retainers from said first position to said second position.

2. The method of claim 1 further comprising coupling a second flange to said first flange, wherein said seal ring provides a seal between said first and second flanges and wherein said first and second flanges have a gap therebetween within which said seal ring retainers are disposed.

3. The method of claim 1 further comprising uncoupling said second flange from said first flange, wherein said seal ring is retained against said first flange.

4. The method of claim 3 further comprising removing said seal ring from said first flange by positioning each of said seal ring retainers in said first position and then removing said seal ring from said seating face.

5. The method of claim 3 wherein each of said seal ring retainers is connected to said first flange by a shearable bolt, wherein the method further comprises removing said seal ring from said first flange by shearing said bolts of said seal ring retainers and then removing said seal ring from said seating face.

6. The method of claim 1 wherein each of said seal ring retainers has a lip which extends around a portion of the circumference of said each seal ring retainer and wherein positioning each of said seal ring retainers in a second position in which said seal ring is retained against said seating face comprises rotating each of said seal ring retainers from a first position in which said lip extends generally radially outward from said seal ring to a second position in which said lip extends generally radially inward toward said seal ring.

7. A method for retaining a seal ring against a pipe flange comprising:

providing a first flange having a seal ring seating face and one or more cams arranged around the circumference of said seating face;

positioning each of said cams in a first position in which a seal ring can be placed against said seating face;

placing a seal ring and position against said seating face; and positioning each of said cams in a second position in which said seal ring is retained against said seating face.

8. The method of claim 7 further comprising coupling a second flange to said first flange, wherein said seal ring provides a seal between said first and second flanges and wherein said first and second flanges have a gap therebetween within which said cams are disposed.

9. The method of claim 7 further comprising uncoupling said second flange from said first flange, wherein said seal ring is retained against said first flange.

10. The method of claim 9 further comprising removing said seal ring from said first flange by positioning each of said cams in said first position and then removing said seal ring from said seating face.

11. The method of claim 9 wherein each of said cams is connected to said first flange by a shearable bolt, wherein the method further comprises removing said seal ring from said first flange by shearing said bolts of said cams and then removing said seal ring from said seating face.

12. The method of claim 7 wherein each of said cams has a lip which extends around a portion of the circumference of said each cam and wherein positioning each of said cams in a second position in which said seal ring is retained against said seating face comprises rotating each of said cams from a first position in which said lip extends generally radially outward from said seal ring to a second position in which said lip extends generally radially inward toward said seal ring.

* * * * *